United States Patent
Aleksic et al.

(10) Patent No.: US 6,927,778 B2
(45) Date of Patent: Aug. 9, 2005

(54) SYSTEM FOR ALPHA BLENDING AND METHOD THEREOF

(75) Inventors: Milivoje Aleksic, Richmond Hill (CA); Aris Balatsos, Toronto (CA); Danny Cheng, Scarborough (CA)

(73) Assignee: ATI Technologies, Inc., Thornhill (CA)

( * ) Notice: Subject to any disclaimer, the term of this patent is extended or adjusted under 35 U.S.C. 154(b) by 237 days.

(21) Appl. No.: 10/146,767

(22) Filed: May 16, 2002

(65) Prior Publication Data

US 2003/0214508 A1 Nov. 20, 2003

(51) Int. Cl.⁷ ................................................. G09G 5/02
(52) U.S. Cl. ..................... 345/592; 345/589; 345/581
(58) Field of Search ............................. 345/581–582, 345/589, 597–599, 601–602, 591–595

(56) References Cited

U.S. PATENT DOCUMENTS

| | | | | | |
|---|---|---|---|---|---|
| 5,231,385 A | * | 7/1993 | Gengler et al. | ............. | 345/592 |
| 5,526,471 A | * | 6/1996 | Tannenbaum et al. | ...... | 345/419 |
| 6,157,387 A | * | 12/2000 | Kotani | ....................... | 345/589 |
| 6,590,573 B1 | * | 7/2003 | Geshwind | .................... | 345/419 |
| 6,621,526 B1 | * | 9/2003 | Yamagishi | .................. | 348/659 |
| 6,624,828 B1 | * | 9/2003 | Dresevic et al. | ............ | 345/771 |
| 6,825,852 B1 | * | 11/2004 | Hamburg | .................... | 345/589 |

* cited by examiner

*Primary Examiner*—Matthew C. Bella
*Assistant Examiner*—Po-Wei (Dennis) Chen
(74) *Attorney, Agent, or Firm*—Toler, Larson & Abel, LLP

(57) ABSTRACT

A system for generating and applying alpha values is discussed. Different sets of alpha values are generated and stored for each color component of a set of image data associated with a foreground object. A graphics-processing engine processes the foreground object with respect to a background object to be displayed in the same location. Red components of the foreground object are blended with red components of the background object using red-specific alpha values. Blue components of the foreground object are blended with blue components of the background object using blue-specific alpha values and green components of the foreground object are blended with green components of the background object using green-specific alpha values.

19 Claims, 3 Drawing Sheets

SYSTEM FOR ALPHA BLENDING AND METHOD THEREOF

FIELD OF THE DISCLOSURE

The present invention relates generally to alpha blending and more particularly to color alpha blending.

BACKGROUND

Alpha blending is used in graphics and image processing. Generally, pixel data of a single pixel used in graphics includes four components: a red component; a blue component; a green component; and, an alpha component. The alpha component can specify a transparency of the pixel. For example, the alpha component can be used to specify how much of a background is visible through a foreground object. The alpha value can also be used to apply particular textures to an object or surface in a graphics image. The alpha value is applied to each of the color components to combine a current pixel of a foreground object to an overlaid pixel, such as to pixels of a background object. The alpha value generally represents a value from 0 to 1, wherein a value of '0' indicates only a pixel from the background object is visible; while, a value of '1' indicates only a pixel from the foreground object is visible. For example, a foreground pixel having a red component, $R_{SRC}$, a blue component, $B_{SRC}$, a green component, $G_{SRC}$, and an alpha, $\alpha$, is converted into a new pixel having a red component, $R_{NEW}$, a blue component, $B_{NEW}$, and a green component, $G_{NEW}$, using the following equations:

$$R_{NEW}=R_{SRC}(\alpha)+R_{BGD}(1-\alpha);$$

$$B_{NEW}=B_{SRC}(\alpha)+B_{BGD}(1-\alpha); \text{ and}$$

$$G_{NEW}=G_{SRC}(\alpha)+G_{BGD}(1-\alpha).$$

The values of $R_{BGD}$, $B_{BGD}$, and $G_{BGD}$ represent red green and blue components, respectively, in a background pixel being blended with the foreground, or source pixel.

The alpha value is applied to all of the color components of a pixel. It may be desired to enhance a particular color of an object for blending. For example, a color may be associated with a particular texture to be applied. It may also be desired to represent a filtering of particular colors to represent a colored glass or particular atmospheric effects in graphics. The color components must be individually enhanced prior to alpha blending to allow the desired effects to be represented. Extra processing must be performed to enhance color components for a blending operation.

From the above discussion, it should be appreciated that an improved method of blending is needed.

BRIEF DESCRIPTION OF THE DRAWINGS

Specific embodiments of the present disclosure are shown and described in the drawings presented herein. Various objects, advantages, features and characteristics of the present disclosure, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

Figure 1:
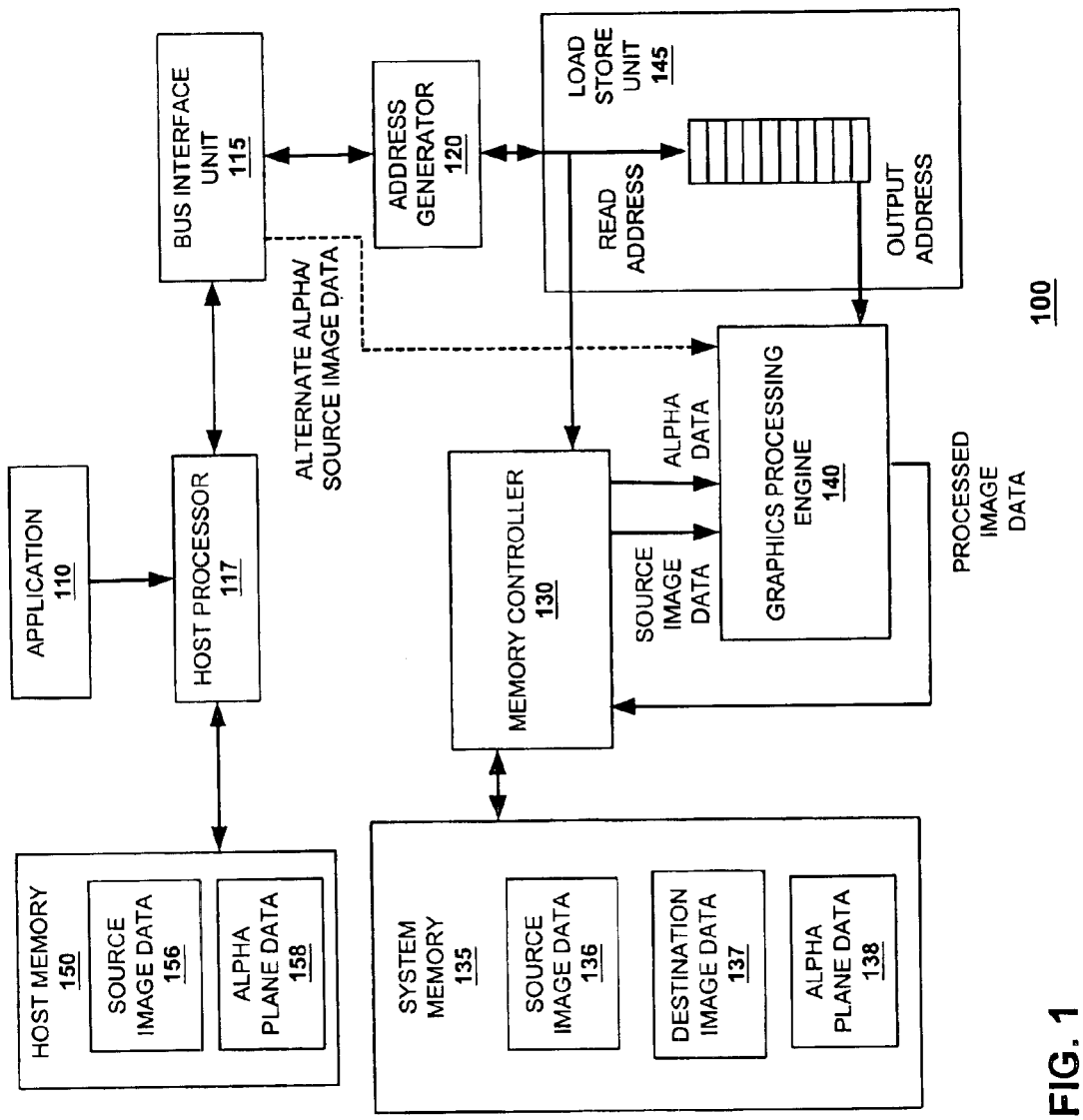
FIG. 1 is a block diagram illustrating a system for processing video requests, according to one embodiment of the present disclosure.

Referring now to FIG. 1, a block diagram illustrating a system for processing video requests is shown and referenced generally as system 100, according to one embodiment of the present disclosure. System 100 includes a host processor 117 having a host memory 150, an address generator 120, a memory controller 130 to access system memory 135, and a graphics processing engine 140 to process source image data 136 into destination image data 137. A set of alpha values stored in alpha plane data 138 is applied to the source image data 136. The set of alpha values include separate alpha values for each color component of source image data. For example, a red alpha value is used to blend a red component of a first pixel of source image data; and, a blue alpha value is used to blend a blue component of the first pixel.

Host processor 117 is used to run applications, such as application 110, and processes in system 100. In one embodiment, application 110 generates graphics data to be processed by graphics processing engine 140. Application 110 can generate graphics data to be stored as source image data 156 in host memory 150. In one embodiment, the source image data 156 includes an alpha value for image pixel of source image data 156. However, the alpha values stored in source image data 156 are color-independent. Application 110 can also provide alpha data values to be stored as a part of alpha plane data 158 in host memory 150. The alpha plane data 158 includes color-specific alpha values having separate alpha values for different color components of the source image data 156. In one embodiment, the color-specific alpha values associated with a particular image pixel are grouped, or packed, together. The host processor can initiate graphics processing by providing data, such as source image data 156 and alpha plane data 158, or graphics requests to address generator 120. In an alternate embodiment, the data is provided to the graphics-processing engine 140, through bus interface unit 115. Application 110 includes a program providing a set of graphics data or a driver used to support a processing of graphics data.

In one embodiment, image data, such as source image data 156, provided or supported by application 110 includes pixel data related to different objects to be displayed. Multiple layers of objects may exist. For example, some objects can be overlaid, in which a first object, a foreground object, is to be displayed on top of another object, a background or destination, object. The pixel data of the foreground object can be combined with the pixels of the background object to simulate particular image effects. Alpha values are supplied to define a proportion of the foreground object and a proportion of the background object to use in generating an output pixel. The alpha value generally represents a value from 0 to 1, wherein a value of '0' indicates only a pixel from the background object is visible; while, a value of '1' indicates only a pixel from the foreground object is visible. The foreground object, or background object, can also be blended with pixels from a mask, such as for applying a texture or simulating atmospheric effects, such as fog.

Source image data 156, generated through application 110, is provided to memory controller 130 for storage in system memory 135. In one embodiment, address generator 120 is used to provide addresses to memory controller 130 indicating portions of system memory 135 to store the source image data 156. In one embodiment, the source image data 156 includes a set of color components and is associated with a set of alpha values, alpha plane data 158, for every pixel to be stored. Color component data associated with a pixel can be grouped together and stored as part of source image data 136. Color-specific alpha values, such as alpha plane data 158, associated with a pixel are stored as alpha plane data 138 in system memory 135. In one embodiment, a set of alpha values exist for every set or portion of image data associated with a pixel. Accordingly, for every set of color components in source image data 136, a set of alpha values is stored in alpha plane data 138. In one embodiment, the alpha values are of the same size as associated color components. The alpha values can be stored in a packed memory format. For example, three four-bit alpha values associated with a single image pixel can be stored together in a 12-bit block of system memory 135. In one embodiment, sets of image data associated with each pixel in source image data 136 also include a single color-independent alpha value, stored with the image data in source image data 136.

In one embodiment, the source image data 136 is stored in a first plane of system memory 135 and the alpha plane data 138 is stored in a second, different, plane of system memory 135. In one embodiment, address generator 120 is capable of mapping portions of alpha plane data 138 to associated portions of source image data 136. Accordingly, for every request to access pixel color components of source image data 136, address generator 120 can request access of associated alpha values in alpha plane data 138. Alternatively, a set of color components can be stored together with an associated set of alpha data in a single portion of memory. In an alternate embodiment, the alpha plane data 138 and/or the alpha plane data 158 include a first plane to store alpha values associated with a first color component, such as the color red, a second plane to store alpha values associated with a second color component, such as the color green, and a third color component to store alpha values associated with a third color component, such as the color green. In another embodiment, the source image data 136, the destination image data 137 and the source image data 156 include color-independent alpha values, in addition to associated color-specific alpha values in alpha plane data 138 or alpha plane data 158.

Address generator 120 receives requests for processing data associated with application 110. In one embodiment, address generator 120 receives the requests through a bus interface unit (BIU) 115, providing an interface with host processor 117. The requests generally include requests to process a portion of source image data 136. Address generator 120 identifies addresses for accessing portions of source image data 136 to be sent to graphics processing engine 140 for processing. In one embodiment, address generator 120 provides two source addresses to memory controller 130 to identify portions of two objects to be blended. Address generator also provides an output address to a load-store unit 146. The output address is used to indicate a portion of destination image data 137, where results from the graphics-processing engine 140 are to be stored.

Memory controller 130 provides access to system memory 135. In one embodiment, memory controller 130 stores source image data 156 or alpha plane data 158 of host memory 150, associated with host processor 117 or application 110. Source image data 156 relating to objects to be displayed or masks to be applied can be stored as a part of source image data 136. Memory controller 130 can also be provided alpha values, such as from alpha plane data 158, to be stored as part of alpha plane data 138. In one embodiment, memory controller 130 receives addresses from address generator 120 indicating portions of system memory 135 to be accessed. Memory controller 130 reads the portion of system memory 135 indicated by the addresses, such as portions of source image data 136 or alpha plane data 138, and provides the read data to graphics processing engine 140. Memory controller 130 can also receive results from graphics processing engine 140. Memory controller 130 can store the results as portions of destination image data 137, at addresses provided by the load-store unit 145, through graphics processing engine 140.

Graphics processing engine 140 processes source image data 136 into destination image data 137. In one embodiment, the graphics-processing engine 140 includes a two-dimensional (2D) processing engine capable of performing various operations on the source image data, such as blending. The graphics-processing engine 140 can also include a 3D processing engine capable of rendering objects to be displayed. In one embodiment, graphics processing engine 140 receives sets of pixel data stored in source image data 136. A set of pixel data includes intensities associated with different color components of a particular pixel. For example, a first portion of the pixel data associated with a foreground object can indicate an intensity of a red color component of a particular pixel, a second portion can indicate an intensity of a green color component of the particular pixel, and a third portion can indicate an intensity of a blue color component of the particular pixel. Similarly, a set of pixel data can be used to provide intensities for several color components of a background object or mask to be blended with the set of pixel data of the foreground object.

The graphics-processing engine 140 also receives a set of alpha values from alpha plane data 138. The alpha values include separate values for blending red components, green components, and blue components. In one embodiment, the graphics-processing engine 140 is further capable of receiving image data, such as source image data 156, and/or alpha values, such as alpha plane data 158, from host processor 117, through bus interface unit 115. However, in one embodiment, a request sent to address generator 120 is used to trigger graphics processing and establish an address for outputting processed results. Accordingly, it may be desired to provide a request or indication to address generator 120 prior to providing data to graphics-processing engine 140 from host processor 117.

The graphics processing engine 140 blends the received sets of pixel data using the alpha values. A color component of a first pixel in a foreground object is combined with a similar color component in a related pixel of a background object. In one embodiment, the pixel in the foreground object is related to the pixel in the background object by display location. If a pixel in the foreground object is to be displayed at the same location as a pixel in the background image, a set of alpha values is used to blend the color components of the two pixels. In one embodiment, a red alpha value is used to combine a red component of the foreground pixel with a red component of the background pixel, a green alpha value is used to combine a green component of the foreground pixel with a green component of the background pixel, and a blue alpha value is used to combine a blue component of the foreground pixel with a blue component of the background pixel. The alpha values determine a proportion, or weighting, of the foreground object's pixel components to the background object's pixel components. In one embodiment, the alpha values are defined as values from zero to one, wherein a value of zero indicates all of a background component is used and a value of one indicates all of a foreground component is used. The graphics-processing engine 140 can blend the foreground pixel components with the background pixel components according to a set of formulae, such as with the following equations:

$$R_{OUT}=R_{SRC}(\alpha_{RED})+R_{BGD}(1-\alpha_{RED});$$

$$B_{OUT}=B_{SRC}(\alpha_{BLUE})+B_{BGD}(1-\alpha_{BLUE});\text{ and}$$

$$G_{OUT}=G_{SRC}(\alpha_{GREEN})+G_{BGD}(1-\alpha_{GREEN}).$$

In the preceding set of equations, $R_{SRC}$, $B_{SRC}$ and $G_{SRC}$ respectively represent the red, blue and green color components of a pixel in the foreground object' $R_{BGD}$, $B_{BGD}$ and $G_{BGD}$ respectively represent the red, blue and green color components of a pixel of the background object. Alpha values, $\alpha_{RED}$, $\alpha_{BLUE}$ and $\alpha_{Green}$, are used to blend the red, blue and green components, respectively, of the foreground and background objects' pixels. In one embodiment, the graphics-processing engine 140 outputs the result of the blending operations as a set of processed image data. The graphics-processing engine uses a next address stored in load-store unit 145 to identify a portion of system memory 135, such as a portion of destination image data 137, to store the processed image data. In on embodiment, the values of the processed image data and the next address are provided to the memory controller 130 for storing the results as part of destination image data 137. It should be appreciated that while blending pixels of a foreground object and a background object have been discussed, the blending described may be performed to combine pixels to be displayed with a texture map or a mask.

Figure 2:
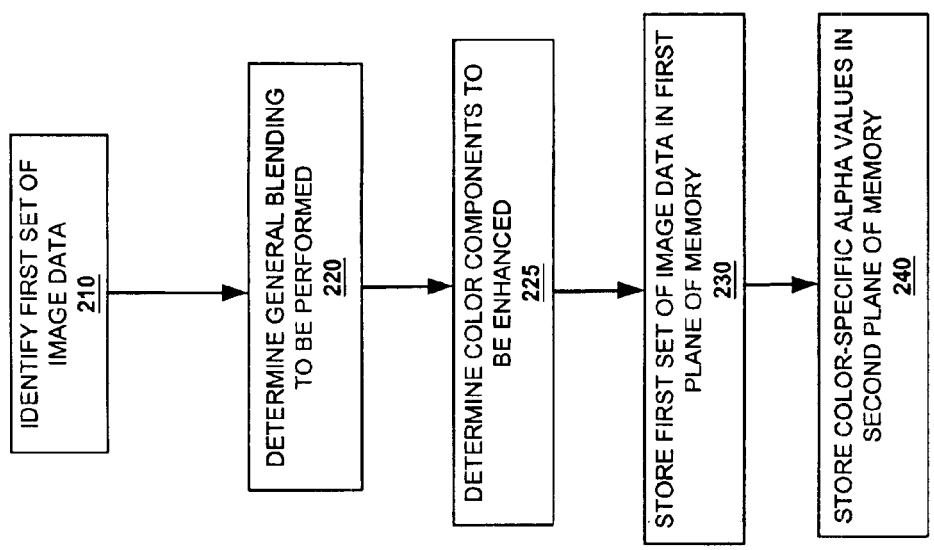
FIG. 2 is a flow diagram illustrating a method of generating color-specific alpha values, according to one embodiment of the present invention.

Referring now to FIG. 2, a flow diagram illustrating a method of generating color-specific alpha values is shown, according to one embodiment of the present invention. In step 210, a first set of image data is identified. The first set of image data can be accessed from memory or be received from a graphics driver or application. In one embodiment, the first set of image data includes color components associated with a pixel in an object to be displayed. In one embodiment, a second set of image data includes color components of a pixel to be blended with the pixel of the first set of image data. For example, in one embodiment, the first set of image data is associated with a foreground object to be displayed and the second set of image data is associated with a background object to be displayed. Blending is performed to display a combination of the foreground object and the background object. Alternatively, the second set of image data can be associated with a texture map or a mask to be applied to the first set of image data. Blending will be performed to apply the texture map or the mask to the first set of image data.

In step 220, a general amount of blending to be performed is determined. Desired graphical effects specified by a graphics driver or software application can be analyzed to determine how blending between the first set of image data and the second set of image data is to be performed. For example, the object associated with the first set of image data may be defined as a translucent object, such as a pane of glass or mist. Accordingly, objects behind the first set of image data, such as the second set of image data, will be at least partially visible behind the first set of image data. Accordingly, alpha values must be generated to allow a displayed pixel to represent both the first set of image data and the second set of image data. Alternatively, the first set of image data can be defined as being opaque. Accordingly, the alpha values may be set to support only the first set of image data in the output display. In one embodiment, step 220 determines an average level of blending and identifies generic, color-independent alpha values to reflect the average level of blending.

In step 225, color components to be enhanced are determined to generate color-specific alpha values. Particular effects specified by a graphics driver or application are analyzed to determine if color-specific blending is to be performed. For example, if the first set of image data is defined as a blue glass, a blue alpha value associated with the first set of image data can be set to allow more of a blue component in the second set of image data to be blended with the first set of image data than a red or green component. Similarly, the effects of red and green alpha values on the second set of image data can be reduced to enhance the blue component. As is subsequently discussed, spatial data can also be taken into consideration to modify color-specific alpha values.

In step 230, the first set of image data is stored in a first plane of memory. In one embodiment, image data associated with particular pixels is grouped together. In step 240, the color-specific alpha values associated with the first set of image data are stored in a second plane of memory. In one embodiment, the color-specific alpha values associated with particular pixels are grouped together. The color-specific alpha values can be stored in a packed data format. In one embodiment, the second plane of memory is different from the first plane of memory. The color-specific alpha values can be mapped to the second plane of memory based on a storage location of the first set of image data. For example, the first set of image data can be stored in a particular portion of the first plane of memory. Similarly, the color-specific alpha values can be stored in a respective portion in the second plane of memory. In an alternate embodiment, the color-specific alpha values are grouped and stored with the first set of image data.

Figure 3:
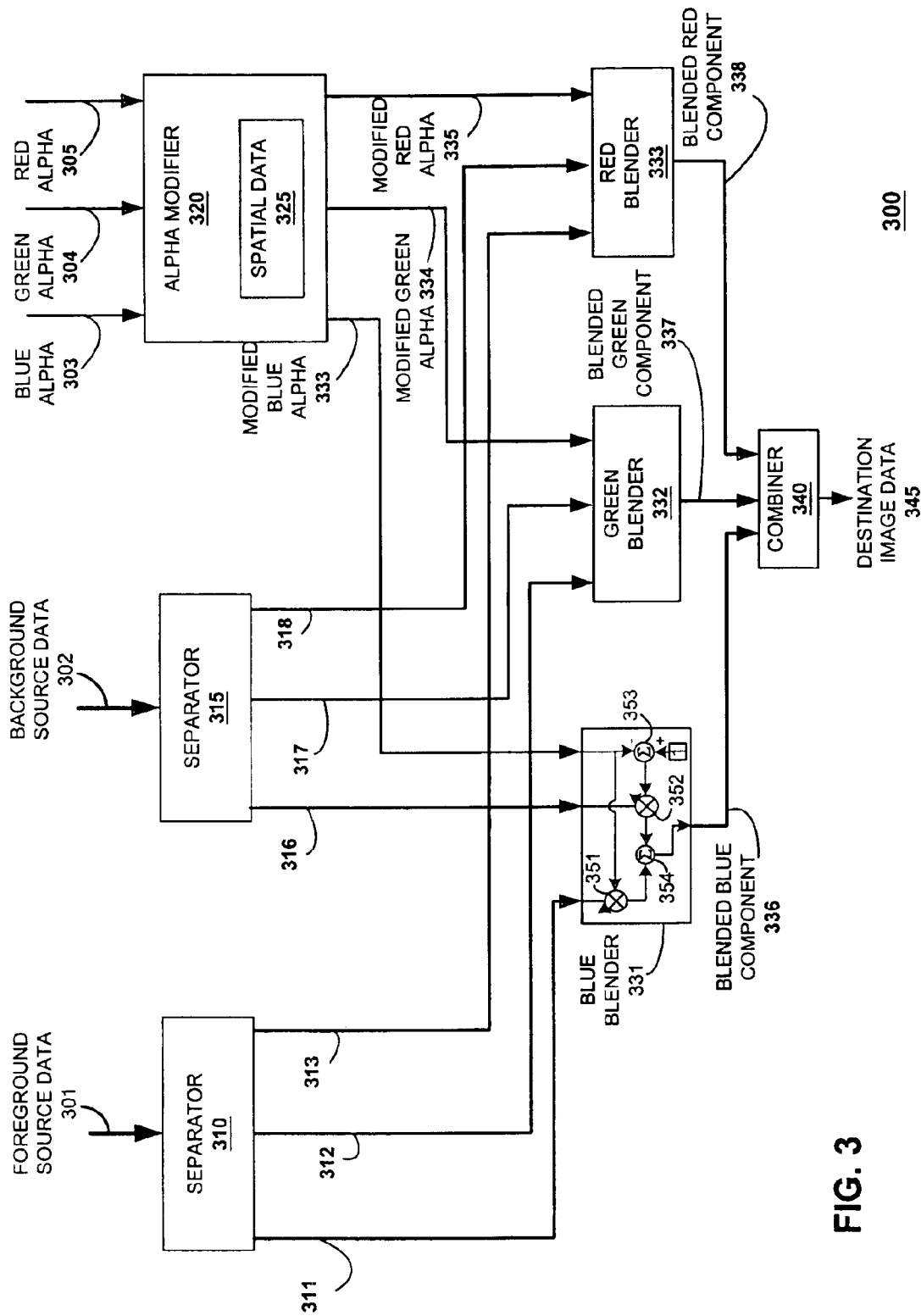
FIG. 3 is a block diagram illustrating a system for blending graphics data, according to one embodiment of the present disclosure.

Referring now to FIG. 3, a block diagram illustrating a system for blending graphics data is shown and referenced generally as system 300, according to one embodiment of the present disclosure. System 300 performs general blending functions and may form a part of operations performed within a graphics processing engine, such as graphics processing engine 140 (FIG. 1). In the illustrated embodiment, system 300 includes separators 310 and 315 for providing color component pixel data from foreground source data 301 and background source data 302, respectively. System 300 can also include an alpha modifier 320, alpha blenders 331–333 and a combiner 340 to destination image data consisting of color components blended from source data 301 and 302.

In one embodiment, separator 310 identifies separate color components, a blue component 311, a green component 312 and a red component 313, from foreground source data 301, received by system 300. In one embodiment, foreground source data 301 includes pixel data associated with a foreground object to be displayed. In comparison, system 300 also receives background source data 302. Background source data 302 includes pixel data associated with a background object to be displayed. In one embodiment, the foreground source data 301 and the background source data 302 includes pixel data to be output at the same position on a display. Separator 315 is used to identify separate color components, a blue component 316, a green component 317 and a red component 318, from background source data 302. The sets of separate color components 311–313 and 316–318 can then be blended separately to generate a set of destination image data 345.

System 300 can include alpha modifier 320 to process a set of received alpha values 303–305 prior to performing blending operations. Alpha values 303–305 include a blue alpha value 303 for blending blue components 311 and 316, a green alpha value for blending green components 312 and 317, and a red alpha value 305 for blending red components 313 and 318. Alpha modifier 320 allows the received alpha values 303–305 to be altered to reflect particular graphics attributes.

In one embodiment, alpha modifier 320 is used to modify the received alpha values 303–305 to apply anti-aliasing on the received source data 301 and 302. In one embodiment, alpha modifier 320 includes spatial data 325. Displays generally use separate red, green and blue pixels to represent a single image pixel. Red display pixels are used to display the red components of image data, green display pixels are used to display the green components of image data, and blue display pixels are used to represent the blue components of image data. Spatial data 325 includes information on the physical location of the red, green and blue display pixels in respect to each other. Through the use of separate color alpha values for modifying separate color components, the separate color display pixels can be used with respect to each other. For example, in cases where high detail is needed to display a fine red line crossing a set of red display pixels, green and blue display pixels can be powered to effect a smoother transition between the red display pixels. Accordingly, by allowing different color display pixels to be modified with respect to each other, the effective resolution of a display can be increased. Alpha modifier 320 can use spatial data 325 to transform the received alpha values 303–305 to apply the spatial data 325 to the received source data 301 and/or 302.

In one embodiment, the received alpha values 303–305 represent a single generic alpha value. The alpha modifier 320 can be set to modify each received alpha value 303–305 differently based on desired color properties. The alpha values 303–305 can be modified independently to produce particular atmospheric effects, such as a colored mist. Alternatively, a texture map or mask provided to the alpha modifier can be used to modify the color components 303–305 independently of each other. Alternatively, the spatial data 325 can be used to generate separate alpha values from received generic alpha values. The alpha modifier 320 outputs independent modified alpha values, modified blue alpha value 333, modified green alpha value 334 and modified red alpha value 335, based on the received alpha values 303–305.

Blue blender 331 is used to combine blue components 311 and 316 using the modified blue alpha value 333, provided by the alpha modifier 320. In one embodiment, blue blender 331 includes a set of components, such as multipliers 351 and 352 and adders 353 and 354 to generate a blended blue component 336 from the foreground blue component 311 and the background blue component 316. As previously discussed, the modified blue alpha value 333 determines the proportions of the foreground blue component 311 and the background blue component 316 used to generate the blended blue component 336. For example, blue blender 331 can generate the blended blue component 336 according to the following equation:

$$B_{OUT}=B_{SRC}(\alpha_{BLUE})+B_{BGD}(1-\alpha_{BLUE}),$$

where the value of $B_{SRC}$ is taken from a current value of the foreground blue component 311, $B_{BGD}$ is taken from a current value of the background blue component 316, $\alpha_{BLUE}$ is taken from the current value of the modified blue alpha value 333, and $B_{OUT}$ represents the output value of the blended blue component 336. Blue blender 331 can generate the blended blue component 336 using hardware or software methods and the equations for blending the blue components 311 and 316 can be altered without departing from the scope of the present disclosure.

The green blender 332 and the red blender 333 operate similar to blue blender 331. Green blender 332 is used to generate a blended green component 337 from the received green components 312 and 317. In one embodiment, green blender 332 generates the blended green component 337 using the following equation:

$$G_{OUT}=G_{SRC}(\alpha_{GREEN})+G_{BGD}(1-\alpha_{GREEN}),$$

where the value of $G_{SRC}$ is taken from a current value of the foreground green component 312, $G_{BCD}$ is taken from a current value of the background green component 317, $\alpha_{GREEN}$ is taken from the current value of the modified green alpha value 334, and $G_{OUT}$ represents the output value of the blended green component 337. Similarly, red blender 333 can generate blended red component 338 using the following equation:

$$R_{OUT}=R_{SRC}(\alpha_{RED})+R_{BGD}(1-\alpha_{RED}),$$

where the value of $R_{SRC}$ is taken from a current value of the foreground red component 313, $R_{BGD}$ is taken from a current value of the background red component 318, $\alpha_{RED}$ is taken from the current value of the modified red alpha value 335, and $R_{OUT}$ represents the output value of the blended red component 338. A combiner 340 can be used to output a single set of pixel data, destination image data 345, having the blended component values 336–338. While blending pixel data associated with two source objects is discussed, it should be appreciated that other forms of graphics blending can be incorporated without departing from the spirit or scope of the present disclosure. For example, blenders 331–333 can also be used to combine image pixels with texture map data or with an image mask, using the alpha values 303–305 or the modified alpha values 331–333 to blend separate color components associated with the image pixels.

The systems described herein may be part of an information handling system. The term "information handling system" refers to any system that is capable of processing information or transferring information from one source to another. An information handling system may be a single device, such as a computer, a hand held computing device, such as a personal digital assistant (PDA), a cable set-top box, an Internet capable device, such as a cellular phone, and the like. Alternatively, an information handling system may refer to a collection of such devices. It should be appreciated that the system described herein has the advantage of blending different color components with different alpha values.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
    accessing pixel color data for a first pixel, wherein the pixel color data as a first color component and a second color component;
    accessing a first alpha value, from a set of alpha values, to modify the first color component of the pixel color data;
    accessing a second alpha value, different from the first alpha value, to modify the second color component of the pixel color data, wherein the second alpha value is accessed from the set of alpha values;
    identifying spatial information between the first color component and the second color component; and
    modifying at least one of the first alpha value or the second alpha value based on the spatial information.

2. The method as in claim 1, wherein said pixel color data further includes a third color component and said method further includes accessing third alpha value, from the set of alpha values, to modify the third color component of the pixel color data.

3. The method as in claim 2, wherein the set of alpha value includes a first plane for accessing the first alpha value, a second plane, different from the first plane, for accessing the second alpha value and a third plane, different from the first plane and the second plane, for accessing the third alpha value.

4. The method as in claim 1, wherein the set of alpha value includes a first plane for accessing the first alpha value and a second plane for accessing the second alpha value.

5. The method as in claim 1, wherein the set of alpha values includes a single plane for accessing the first alpha value and the second alpha value.

6. The method as in claim 1, wherein the set of alpha values is attached to the pixel color data and the first alpha value and the second alpha value are accessed from the pixel color data.

7. The method as in claim 1, further including storing the first and second alpha values in memory prior to accessing the pixel color data for the pixel.

8. The method as in claim 1, wherein the first alpha value is directly applied to the first color component to alter a value of the first color component of the pixel color data.

9. The method as in claim 1, wherein the first alpha value is applied to modify alpha data associated with the pixel.

10. The method as in claim 1, wherein the first alpha value is the same size as the first color component.

11. The method as in claim 1, wherein accessing the first alpha value and accessing the second alpha value are performed simultaneously.

12. A system comprising:
    memory having a plurality of planes, the plurality of planes including:
        a first plane to store source image data, said source image data including pixel color data having a first color component and at least a second color component associated with a first pixel;
        a second plane, different from the first, to store a plurality of alpha values, said plurality of alpha values including a first alpha value to modify the first color component and a second alpha value to modify the at least a second color component;
    a memory controller to provide access of said memory for an image processing module;
    said image processing module having:
        an alpha modifier module to modify at least one of said first alpha value or said second alpha value based on spatial information between the first color component and the second color component;
        a first blender to modify said first color component based on said first alpha value; and
        at least a second blender to modify said at least a second color component based on said at least a second alpha value.

13. The system as in claim 12, wherein said pixel color data further includes a third color component and a fourth color component associated with a second pixel, wherein said first color component and said third color component are associated with a same first color and said second color component and said fourth color component are associated with a same second color.

14. The system as in claim 13, wherein the first pixel is associated with a foreground pixel and the second pixel is associated with a background pixel.

15. The system as in claim 13, wherein said first blender of the image processing module further used to modify said first color component based on said third color component and said second blender of the image processing module further used to modify said second color component based on said fourth color component.

16. The system as in claim 12, wherein:
    said pixel color data further includes a third color component associate with the first pixel;
    said plurality of alpha values further include a third alpha value to modify said third color component.

17. The system as in claim 16, wherein the first color component represents a red component of the first pixel, the second color component represents a green component of the first pixel and the third color component represents a blue component of the first pixel.

18. The system as in claim 16, wherein said image processing module further includes a third blender to modify said third color component based on said third alpha value.

19. The system as in claim 12, wherein said first blender of the image processing module modifies said first color component simultaneous with the second blender modifying the second color component.

* * * * *

UNITED STATES PATENT AND TRADEMARK OFFICE
CERTIFICATE OF CORRECTION

PATENT NO.    : 6,927,778 B2
DATED         : August 9, 2005
INVENTOR(S)   : Milivoje Aleksic et al.

It is certified that error appears in the above-identified patent and that said Letters Patent is hereby corrected as shown below:

<u>Column 9,</u>
Line 19, change "as" to -- has --.
Lines 38 and 44, change "value" to -- values --.

<u>Column 10,</u>
Line 47, change "associate" to -- associated --.

Signed and Sealed this

Sixth Day of December, 2005

JON W. DUDAS
*Director of the United States Patent and Trademark Office*